Patented May 24, 1949

2,471,339

UNITED STATES PATENT OFFICE 2,471,339

LONG-CHAIN AMINE SALTS AS FUNGICIDES AND BACTERICIDES

Arthur Minich, Westfield, N. J., and Milton Nowak, Brooklyn, N. Y., assignors, by direct and mesne assignments, to Nuodex Products Co., Inc., Elizabeth, N. J., a corporation of New Jersey No Drawing. Application June 6, 1946, Serial No. 674,940

2 Claims. (Cl. 167—22)

This invention relates to toxicants and the like and more particularly those employed for the prevention of mildew, fungi and bacterial attacks on materials of commerce, although not necessarily restricted to these specific uses. The products of this invention, for example, may be used as disinfectant washes or they may be employed in treating plants to render them immune to attach by fungi and other micro-organisms.

We have found it desirable for the uses to which the compositions of this invention are to be applied, to so constitute them that they are substantially water-soluble, whereby they may be put into water solution for convenient and expeditious application. However, experience has shown that many of the water-soluble toxicants heretofore used for the general uses stated, are not as effective as desired and we have been met with a problem of increasing their effectiveness.

Extensive experimentation and research have shown that it is possible, through the use of certain materials which are, per se, water-insoluble, to bring about, through chemical reaction of these materials, water-soluble products, which are highly effective for the purposes stated. For example, tests have shown that certain organic amines, which are by themselves substantially water-insoluble, may be caused to react with certain substantially water-insoluble organic acids, the end product being the single or multiple amine salt of the particular acid or acids involved in the reaction. Such a salt or salts are substantially water-soluble. This result is totally unexpected and could not have been anticipated or predicted. Generally water-insoluble acids with water-insoluble amines will form water-insoluble salts, but we have discovered that when reacting certain particular water-insoluble amines with water-insoluble acids, we not only obtain water-soluble salts, but that these particular salts are much more effective as toxicants for the purposes stated than any of the so-called water-soluble toxicants heretofore employed for such purposes.

Furthermore, an unusual property of the salts of this invention is that, upon application to such articles as, e. g., cotton fabric, they will be fairly resistant to subsequent leaching out by water, thus providing more permanent protection than could be expected from a water-soluble material.

Exhaustive tests have shown that the following amines are particularly effective in the carrying of this invention, namely; dodecyl amine, "coconut" amine and octadecenyl amine.

The following acids may be reacted singly or in combination with one or more of the foregoing amines in the carrying out of this invention, to produce remarkably effective end products: salicylic acid, benzoic acid, o-chlorbenzoic acid and anthranilic (o-aminobenzoic) acid. It will be understood that some of these acids are not entirely water-insoluble, in that they may be water-insoluble to some extent. However, they are for all practical purposes considered in the arts as water-insoluble acids and are so treated in connection with this invention.

The foregoing amines and acids may be reacted together in various combinations provided, however, that the ratios of a single amine or a combination of amines to a single acid or a combination of acids is always in such stoichiometrical proportions so as to produce a substantially neutral salt. Slightly greater amounts of either one of the reactants will not interfere with the proper functioning of the end product.

The following examples are illustrative of the toxicants of this invention:

*Example 1.—1 amine and 1 water insoluble acid*

To a solution of 18.5 grams (0.1 M.) of dodecylamine in 32.3 grams of 95% ethanol is added 13.8 grams (0.1 M.) of salicylic acid, and the mixture stirred until a clear homogeneous solution is obtained. The product is a 50% solution of dodecylamine salicylate in alcohol and may be diluted to a 5% solution in water. This aqueous solution is slightly cloudy but soapy in character.

The end product made according to this formula has been tested in various ways as a fungicide. For example, it was diluted with water to 2% concentration and then applied to a masonry wall which had developed considerable mildew on the painted surface. After the application of this diluted fungicide upon the infected wall surface, a regular paint coat was applied. This was also done with a portion of the mildewed surface which had not been treated with this fungicide. After several months exposure it was found that the paint applied over the untreated infected surface again showed mildew. By comparison, the treated surface did not produce any new outbreak of mildew. Furthermore, the product was tested by application to ten-ounce cotton duck. This fabric, as well as an untreated fabric, was subjected to a standard mildew test; namely, the Aspergillus niger test. In this test the untreated fabric in only 3 days incubation showed a heavy growth of mildew whereas the treated fabric, carrying only .25% of the fungicide per weight, remained free from mildew.

*Example 2.—1 amine and 1 water-insoluble acid*

To a solution of 18.5 grams dodecylamine in 30.7 grams of 95% ethanol is added 12.2 grams of benzoic acid, and the mixture stirred until a clear homogeneous solution is obtained. The product is a 50% solution of dodecylamine benzoate in alcohol and may be diluted to a 5% solution in water. This aqueous solution is slightly cloudy but soapy in character.

The end product of this reaction represents a highly effective and versatile fungicide and bactericide. For example, this product has been found to be quite effective in stabilizing such compositions as starch pastes which are usually quite unstable, due to bacterial and fungi attacks. Furthermore, this product has shown itself to be very effective in rendering such fabrics as shower curtains free of mildew when applied on the fabrics in concentrations ranging down to as low as .25% per weight of fabric.

*Example 3.—1 amine and 1 water-insoluble acid*

To a solution of 18.5 grams of dodecyl amine in 34.1 grams of 95% ethanol is added 15.6 grams of o-chlorbenzoic acid and the mixture stirred until a clear homogeneous solution is obtained. The product is a 50% solution of dodecylamine-o-chlorbenzoate in alcohol and may be diluted to a 5% solution in water. This aqueous solution is slightly cloudy but soapy in character.

The end product of this reaction represents a very effective agent to control microbial attack. For example, when it was applied on shoes and other leather articles in various low concentrations (as low as .5% per weight of leather) it was very effective in inhibiting mildew growth even when the leather articles were exposed to conditions favorable for such growth. Similarly, when applied on fabric in concentrations as low as .1% per weight of fabric it showed remarkable resistance to mildew growth, as tested by the standard *Chaetomium globosum* procedure.

*Example 4.—1 amine and 1 water-insoluble acid*

To a solution of 18.5 grams of dodecylamine in 32.2 grams of 95% ethanol is added 13.7 grams of o-aminobenzoic acid and the mixture stirred until a clear homogeneous solution is obtained. The product is a 50% solution of dodecylamine o-aminobenzoate in alcohol and may be diluted to a 5% solution in water. This aqueous solution is slightly cloudy but soapy in character.

This reaction product is a highly versatile fungicide and has shown excellent results in the treatment of paper, wood, etc., to protect them from fungi and other microbial attacks.

*Example 5.—1 amine and 2 water-insoluble acids*

To a solution of 18.5 grams of dodecylamine in 33.2 grams of 95% ethanol is added 6.9 grams salicylic acid and 7.8 grams o-chlorbenzoic acid and the mixture stirred until a clear homogeneous solution is obtained. The product is a 50% solution of a multiple salt of dodecylamine salicylate and salicylate o-chlorbenzoate in alcohol, and may be diluted to a 5% solution in water. This aqueous solution is slightly cloudy but soapy in character.

The product obtained by this formula represents a highly effective fungicide. It may be used in the treatment of textiles, sizings, glues, etc.

*Example 6.—1 amine and 1 water-insoluble acid*

To a solution of 20 grams of "coconut" amine in 33.8 grams of 95% ethanol is added 13.8 grams of salicylic acid and the mixture stirred until a clear homogeneous solution is obtained. The product is a 50% solution of "coconut" amine salicylate in alcohol and may be diluted to a 5% solution in water. This aqueous solution is slightly cloudy but soapy in character.

This reaction product has been thoroughly checked and has proved itself an excellent agent for the control of microbial attacks on many articles and materials of commerce.

*Example 7.—1 amine and 1 water-insoluble acid*

To a solution of 20 grams of "coconut" amine in 35.6 grams of 95% ethanol is added 15.6 grams of o-chlorbenzoic acid and the mixture stirred until a clear homogeneous solution is obtained. The product is a 50% solution of "coconut" amine o-chlorbenzoate in alcohol and may be diluted to a 5% solution in water. This aqueous solution is slightly cloudy but soapy in character.

The end product of this reaction represents an excellent fungicide useful for the treatment of cellulosic materials such as cotton goods, rugs, etc. to render them resistant to fungus attacks.

*Example 8.—1 amine and 1 water-insoluble acid*

To a solution of 20 grams of "coconut" amine in 32.2 grams of 95% ethanol is added 12.2 grams of benzoic acid and the mixture stirred until a clear homogeneous solution is obtained. The product is a 50% solution of "coconut" amine benzoate in alcohol and may be diluted to a 5% solution in water. This aqueous solution is slightly cloudy but soapy in character.

This product has been found to possess excellent performance for the treatment of wet wash in laundries and other similar conditions where mildew readily develops.

*Example 9.—1 amine and 1 water-insoluble acid*

To a solution of 26.6 grams of octadecenyl amine in 40.4 grams of 95% ethanol is added 13.8 grams of salicylic acid and the mixture stirred until a clear homogeneous solution is obtained. The product is a 50% solution of octadecenyl amine salicylate in alcohol and may be diluted to a 5% solution in water. This aqueous solution is slightly cloudy but soapy in character.

This product has been checked and found to be a very effective fungicide.

*Example 10.—1 amine and 1 water-insoluble acid*

To a solution of 26.6 grams of octadecenyl amine in 42.2 grams of 95% ethanol is added 15.6 grams of o-chlorbenzoic acid and the mixture stirred until a clear homogeneous solution is obtained. The product is a 50% solution of octadecenyl amine o-chlorbenzoate in alcohol and may be diluted to a 5% solution in water. This aqueous solution is slightly cloudy but soapy in character.

The end product of this formula will protect many articles of commerce from microbial attacks even when used in percentages as low as .25% per weight of the article.

*Example 11.—1 amine and 1 water-insoluble acid*

To a solution of 26.6 grams of octadecenyl amine in 40.3 grams of 95% ethanol is added 13.7 grams of o-aminobenzoic acid and the mixture stirred until a clear homogeneous solution is obtained. The product is a 50% solution of octadecenyl amine o-aminobenzoate in alcohol and may be diluted to a 5% solution in water. This aqueous solution is slightly cloudy but soapy in character.

This product represents a very satisfactory fungicide for general use.

*Example 12.—1 amine and 2 water-insoluble acids*

To a solution of 26.6 grams of octadecenyl amine in 39.5 grams of 95% ethanol is added 6.8 grams o-aminobenzoic acid and 6.1 grams benzoic acid and the mixture stirred until a clear homogeneous solution is obtained. The product is a 50% solution of octadecenyl benzoate-anthranilate in alcohol and may be diluted to a 5% solution in water. This aqueous solution is slightly cloudy but soapy in character.

The reaction product made by the above formula is a very excellent fungicide. For example, when applied on fabrics as little as .5% per weight of fabric will render it remarkably resistant to even severe mildewing and rotting conditions.

*Example 13.—2 amines and 1 water insoluble acid*

To a solution of 9.3 grams dodecylamine and 13.3 grams octadecenyl amine in 34.8 grams of 95% ethanol is added 12.2 grams benzoic acid and the mixture stirred until a clear homogeneous solution is obtained. The product is a 50% solution of dodecylamine-octadecenyl amine benzoate in alcohol and may be diluted to a 5% solution in water. This aqueous solution is slightly cloudy but soapy in character.

This formula produces a highly potent agent for the control of microbial attacks. For example it will adequately protect sizings, glues, artificial leather, etc., from decomposition and surface disfiguration due to microbial attacks.

All of the examples heretofore given involve the reaction of both amines and acids which are substantially water-insoluble. We have found, however, that certain water-soluble acids may be included within the reaction without detracting from the effectiveness and performance of the end product. Note the following:

*Example 14.—1 amine and 1 water-insoluble acid and 1 water-soluble acid*

To a solution of 8.2 grams of lactic acid (80%) and 8.5 grams of salicylic acid in 58.3 grams of ethylene glycol monoethyl ether is added 25 grams of dodecylamine and the mixture agitated until a clear homogeneous solution is obtained. The product is a 40% solution of a multiple dodecylamine salt of these acids in ethylene glycol monoethyl ether. It is a clear pale amber liquid and can be diluted in water to 5% solids forming a clear aqueous solution.

The product obtained by this formula represents a very effective fungicide. It is relatively non-toxic and non-irritating and thus might be used for many applications. For example, it has been found to be excellent for the prevention of mildew spots on wet wash in laundries and in homes. It also has been found to prevent mildew growth on flooring in homes during the humid seasons. Similarly, its use as a wash for mildewed walls has proven its benefits. It also may be used as a constituent of leather dressings, starch sizes and any other applications where it is necessary to inhibit or prevent microbial attacks.

*Example 15.—1 amine and 1 water-insoluble acid and 1 water-soluble acid*

To a solution of 26.6 grams of octadecenyl amine in 37.4 grams of 95% ethanol is added 3 grams of acetic acid and 7.8 grams of o-chlorbenzoic acid and the mixture stirred until a clear homogeneous solution is obtained. The product is a 50% solution of octadecenyl acetate-o-chlorbenzoate in alcohol and may be diluted to a 5% solution in water. This aqueous solution is slightly cloudy but soapy in character.

The product obtained by this procedure represents a very satisfactory fungicide. It has been checked and proven to be very effective for the treatment of various cellulosic materials and articles including plastics, wood, textiles, etc.

*Example 16.—1 amine and 1 water-insoluble acid and 1 water-soluble acid*

To a solution of 8.a grams of lactic acid (80%) and 7.3 grams of benzoic acid in 57.3 grams of ethylene glycol monoethyl ether is added 25 grams of dodecylamine and the mixture agitated until a clear homogeneous solution is obtained. The product is a 40% solution of a multiple dodecylamine salt of these acids in ethylene glycol monoethyl ether. It is a clear pale amber liquid and can be diluted in water to 5% solids forming a clear aqueous solution.

The end product obtained according to this formula has been investigated for its fungicidal performance. It was found to be very effective in concentrations as low as .1% per weight of material to be protected.

It is to be understood that the examples hereinbefore given are not advanced by way of limitation to the particular water-insoluble amines reacted with just these particular water-insoluble acids, for similar reactions may be carried out through the interaction of one or more of any of the water-insoluble amines herein referred to and one or more of the water-soluble acids referred to. Likewise other multiple salts of substantially water-insoluble acids and water-soluble acids may be prepared in such reactions in accordance with this invention.

By "multiple salts" we mean a salt which results from the conjoint reaction of one or more amines with one acid or one or more amines with a plurality of acids.

The foregoing detailed description sets forth the invention in its preferred practical forms, but the invention is to be understood as fully commensurate with the appended claims.

Having thus fully described the invention, what we claim as new and desire to secure by Letters Patent is:

1. A microbicidal agent comprising: the reaction product of dodecylamine approximately 65%, lactic acid approximately 16% and salicylic acid approximately 19%.

2. A microbicidal composition comprising approximately 40% of a homogeneous solution of the reaction product of dodecylamine approximately 65%, lactic acid approximately 16%, salicylic acid approximately 19%, and approximately 60% of ethylene glycol monoethyl ether.

ARTHUR MINICH.
MILTON NOWAK.

REFERENCES CITED

The following references are of record in the file of this patent:

FOREIGN PATENTS

| Number | Country | Date |
|---|---|---|
| 441,120 | Great Britain | 1936 |